(12) United States Patent
Goetz et al.

(10) Patent No.: US 6,349,204 B1
(45) Date of Patent: Feb. 19, 2002

(54) PROVISION OF TELECOMMUNICATIONS CONTROL PROGRAM DATA PURSUANT TO PRELIMINARY DATA EXCHANGE BETWEEN SYSTEM ELEMENTS

(75) Inventors: Ian Goetz, Thame; Mark C. Coxon, Ipswich; John R. Davis, Flowton, all of (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 08/973,119

(22) PCT Filed: Jan. 30, 1997

(86) PCT No.: PCT/GB97/00264

§ 371 Date: Feb. 3, 1998

§ 102(e) Date: Feb. 3, 1998

(87) PCT Pub. No.: WO97/29606

PCT Pub. Date: Aug. 14, 1997

Related U.S. Application Data

(63) Continuation-in-part of application No. 08/679,211, filed on Jul. 12, 1996, now abandoned, and a continuation-in-part of application No. 08/647,823, filed on May 15, 1996.

(30) Foreign Application Priority Data

| Feb. 12, 1996 | (EP) | 96300950 |
| Feb. 12, 1996 | (EP) | 96300951 |
| Feb. 12, 1996 | (GB) | 9602790 |
| Feb. 12, 1996 | (GB) | 9602804 |
| Aug. 15, 1996 | (EP) | 96305956 |
| Aug. 15, 1996 | (GB) | 9617131 |

(51) Int. Cl.[7] ............................................. H04M 3/00
(52) U.S. Cl. ........................ 455/419; 455/435; 455/517; 455/560
(58) Field of Search .................................. 455/418, 419, 455/69, 68, 186.1, 517, 435, 466, 63, 62, 420

(56) References Cited

U.S. PATENT DOCUMENTS

| 4,910,794 A | 3/1990 | Mahany |
| 5,046,082 A | 9/1991 | Zicker et al. |

(List continued on next page.)

FOREIGN PATENT DOCUMENTS

| DE | 3721360 A1 | 1/1989 |
| DE | 4321381 A1 | 1/1995 |

(List continued on next page.)

*Primary Examiner*—William Trost
*Assistant Examiner*—Tilahun Gesesse
(74) *Attorney, Agent, or Firm*—Nixon & Vanderhye P.C.

(57) ABSTRACT

During connection set up between a mobile telephone and a base station, program data is acquired from the network for controlling its mode of operation. The mobile telephone and base station each have a memory for storing program data relating to one or more modes of operation. The base station transmits a signal indicative of a preferred mode of operation and the mobile responds with a signal indicative of whether its memory already contains program data for this mode of operation. If not, then the base station transmits the required program data. The base station and mobile telephone then operate in this preferred mode. If the mobile is not so capable (for example because it has insufficient memory), the process is repeated with different mode control programs until the most appropriate mutually compatible program is identified. If a call attempt is initiated before this process is complete, the process is curtailed, such that the base station and mobile telephone identify programs already stored in the memory, but make no attempt to load a new program, as this could delay call set-up.

21 Claims, 5 Drawing Sheets

U.S. PATENT DOCUMENTS

| | | | |
|---|---|---|---|
| 5,257,401 A | 10/1993 | Dahlin et al. | |
| 5,327,576 A | 7/1994 | Uddenfeldt et al. | |
| 5,414,751 A | 5/1995 | Yamada | |
| 5,418,837 A | 5/1995 | Johansson et al. | |
| 5,524,135 A | * 6/1996 | Zikovsky et al. | 455/419 |
| 5,615,250 A | 3/1997 | Kobayashi | |
| 5,649,299 A | * 7/1997 | Battin et al. | 455/62 |
| 5,742,910 A | 4/1998 | Gallant et al. | |
| 5,748,720 A | 5/1998 | Loder | |
| 5,761,610 A | 6/1998 | Sorensen et al. | |
| 5,765,105 A | 6/1998 | Kuriki | |
| 5,822,692 A | 10/1998 | Krishan et al. | |
| 5,842,210 A | 11/1998 | Chen et al. | |
| 5,878,339 A | * 3/1999 | Zicker et al. | 455/419 |
| 5,896,566 A | * 4/1999 | Averbuch et al. | 455/419 |

FOREIGN PATENT DOCUMENTS

| | | | | |
|---|---|---|---|---|
| EP | 0297616 A1 | | 7/1988 | |
| EP | 0 423 485 A1 | | 4/1991 | |
| EP | 0459344 A | * | 5/1991 | |
| EP | 0 472 511 A2 | | 8/1991 | |
| EP | 0510322 A2 | | 2/1992 | |
| EP | 0825791 A1 | | 2/1998 | |
| GB | 2270442 A | | 3/1994 | |
| GB | 2294844 | * | 8/1996 | H04Q/7/38 |
| WO | WO-92/17943 | * | 10/1992 | H04B/1/00 |
| WO | WO 93/17512 | | 9/1993 | |
| WO | WO 95/04425 | | 2/1995 | |
| WO | WO 95/07578 | | 3/1995 | |
| WO | WO 95/28814 | | 10/1995 | |
| WO | WO 96/02091 | | 1/1996 | |
| WO | WO96/24231 A | | 8/1996 | |

* cited by examiner

PROVISION OF TELECOMMUNICATIONS CONTROL PROGRAM DATA PURSUANT TO PRELIMINARY DATA EXCHANGE BETWEEN SYSTEM ELEMENTS

This application is a continuation-in-part of U.S. applications Ser. No. 08/679,211 filed Jul. 12, 1996 now abandoned and 08/647,823 filed May 15, 1996.

BACKGROUND OF THE INVENTION

1. Field of the Invention

The present invention relates to telephone systems. It is of particular application to mobile telephone systems, but can also find application in other systems.

2. Related Art

The GSM (Global System for Mobile communications) cellular telephone system currently supports three speech coding algorithms, the 13 kbit/s "full-rate" codec (coder-decoder), the 13 kbit/s "enhanced full-rate" codec and the 5.6 kbit/s "half-rate" codec. Control programs, based on these codec algorithms, are stored in read-only memory (ROM) within the telephone and the fixed part of the network, typically in a radio base station control system. It is envisaged that improved algorithms, providing more accurate or faster coding, will be developed in the future, but if the customer is to make use of such an algorithm he has to replace his telephone by one programmed with the new codec algorithm. Conflict can arise between the customer and the network operator over who should bear the cost of such replacement.

Various proposals have been made for upgrading or modifying systems for telecommunications terminals in which an upgrade program is transmitted over the network from a network based control facility, allowing the upgrading of suitably programmable telephones. (See for example DE3721360 (Deutsche Bundesposte) and EP0459344 (Alcatel). However the upgrading program takes time to transmit, and mobile telecommunications terminals have finite memory capacity.

SUMMARY OF THE INVENTION

According to one aspect of the present invention, there is provided a method of setting up a connection between a first element and second element of a telecommunications system in which at least the first element is capable of transmitting program data to the second element for controlling the operation of the second element ; the method comprising the steps of:

exchanging data to identify the most appropriate program data to use for communication between the first and second elements, exchanging data relating to the program data already available to each element; and if the second element does not already have available to it the identified program data, transmitting the program data from the first element to the second element.

This arrangement ensures that program data is only transmitted if the program data is required for the connection currently being set up. This reduces the amount of data transmitted, and reduces the likelihood of memory in the second element being over-written unnecessarily. The appropriateness of program data may be determined in relation to the type of signal to be transmitted, the quality of the signal, the memory capacity of the second element, and the capabilities of any intermediate links.

In a preferred arrangement, the two elements may be a radio base station and a mobile station of a cellular mobile radio system. Alternatively they may be two telecommunications terminals, communicating with each other over a telecommunications network. The program data transmitted from one network element to the other may be configured such that it can only be used for telecommunications transactions between those two network elements.

According to another aspect, the invention provides an element of a telecommunications system having means for storing program data suitable for controlling the operation of a second element;

means for selecting the most appropriate program data to use for communication between the first and second elements; and means for exchanging information relating to the program data already available to each element;

means for transmitting the selected program data to the second element if the second element does not already have available to it the selected program data.

According to a further aspect, the invention comprises an element of a telecommunications system capable of receiving program data for controlling its operation from another element, comprising:

means for exchanging data relating to the program data already available to each element, and for exchanging data to identify the most appropriate program data to use for communication between the elements; and means for receiving and storing the program data from the other element if the element does not already have available to it the identified program data.

Preferably, the first and second elements each have a memory for storing program data relating to one or more modes of operation; and the method comprises the steps of:

transmitting a signal indicative of a proposed mode of operation from the first element to the second element;

detecting the initial signal at the second element;

transmitting a response signal from the second element to the first element, the response signal having a first characteristic if the memory in the second element does not contain program data for the proposed mode of operation indicated by the signal, and having a second characteristic if the memory already contains the program data;

transmitting the program data from the first element to the second element if the first characteristic is detected; and operating the elements according to the proposed mode if either the first or the second characteristic is detected.

In a preferred arrangement the method comprises an initial process for selecting the proposed mode of operation, the process comprising the steps of:

identifying the type of connection to be made;

selecting a mode of operation suitable for the said connection type, for which the first element has the necessary program data;

exchanging signals between the first element and the second element to determine what resources are available to the second element;

if the second element does not have appropriate resources for supporting the necessary program data, repeating the mode selection and signal exchange steps for further modes of operation until a mode of operation compatible with the capabilities of the second element is identified.

In one arrangement signals are initially exchanged to determine whether the second element has appropriate resources for the selected program.

Repetitions of the process may be initiated alternately from each of the two elements. This arrangement is preferred when the two elements are both telecommunications terminals, each capable of transmitting program data to the other, as it will take fewer iterations to identify the optimum program capable of operation on both elements, whichever element initially has it. The optimum program will either be a program carried by the unit with the smaller memory (which must, necessarily, fit the other memory) or, it the other unit carries a better program which can nevertheless be accommodated in the smaller memory, that better program.

When the two elements are respectively a network element (such as the controller of a radio base station), and a terminal (such as a mobile radio unit), new programs are likely to be fed into the system only from the network side of the link. It is also unnecessary in practice to allow for the possibility that the terminal has greater memory capacity than the base station control system. In this case a measure of the actual memory capacity of the smaller unit (i.e. the terminal) can be used by the larger unit (the base station control system) to identify the optimum program more quickly.

The second element may include a further memory storing further program data for use in a default mode, the processing means being operable selectively according to said program data or said further program data, in dependence on the characteristics of the signals.

The first element can also be arranged to operate in a default mode if no response to the initial radio signal is received from the second element.

BRIEF DESCRIPTION OF THE DRAWINGS

Embodiments of the present invention will now be described, by way of example, with reference to the accompanying drawings; in which.

DETAILED DESCRIPTION OF EXEMPLARY EMBODIMENT

In the embodiment illustrated in FIGS. 1 to 4 the base station control system 10 has a store of suitable codec programs available to it, which can be downloaded to the mobile telephone 1 as required for individual telecommunications transactions. The mobile telephone 1 has a memory in which a default program is stored in read-only memory, and one or more suitable alternative programs can be stored in electronically erasable programmable read-only memory (EEPROM) such that further programs can be stored if required to carry out a different transaction. These will typically be codec programs requiring a lower bit-rate or providing improved error correction capabilities, which may require more individual data memory within the mobile telephone than the default program, or may simply be faster or more efficient, but require the same amount of memory.

Figure 1:
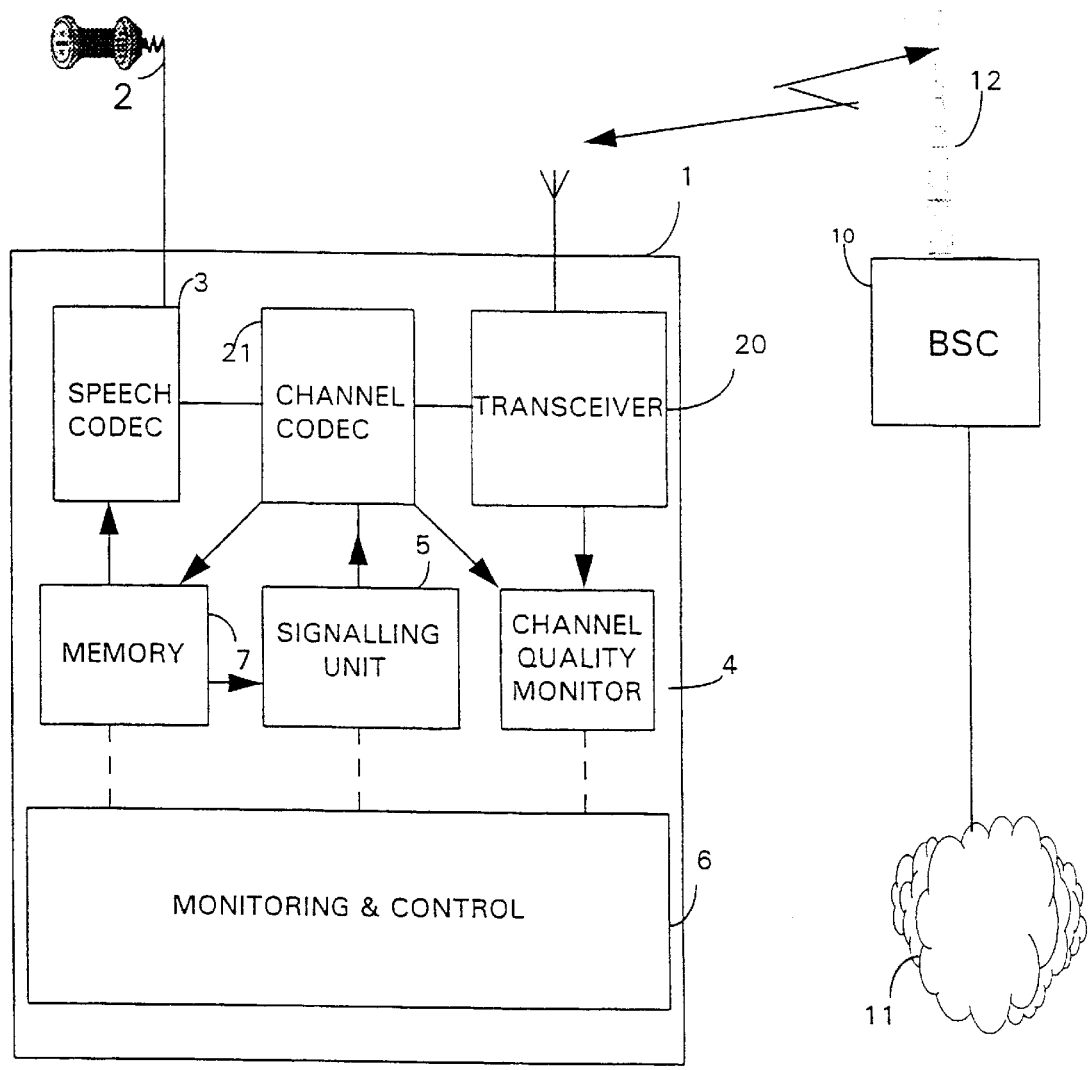
FIG. 1 is a block diagram of a mobile telephone system, according to the present invention, including a mobile telephone 1 and a base station control system 10.

Referring firstly to FIG. 1, a mobile telephone 1 comprises a user interface (mouthpiece and earpiece) 2. It also comprises transceiver circuitry 20, a channel quality monitor 4, signaling unit 5, a monitoring and control means 6, a memory 7, and speech and channel codecs 3, 21; which may all conveniently be embodied in a microprocessor, and whose functions will now be described. The speech codec 3 operates according to program data stored in the memory 7. The program data includes data based on signal coding and decoding algorithms, which it uses to digitally encode analogue signals received from the user interface 2. These encoded signals are then passed to a channel codec 21 which applies error correction, control data and synchronisation data to the signal before passing the resulting signal to a transceiver 20 which modulates the resulting signal onto a radio frequency carrier for transmission to a base station 12, and from there to the base station control system 10 and thus the rest of the network 11. The operation of the transceiver 20, channel codec 21 and speech codec 3 also operate in the converse sense, respectively to extract the digital modulation from an incoming RF carrier, remove control data, and apply error correction processes according to the received data, and then to decode the digital signals into analogue form for the user interface 2.

The channel quality monitor 4 monitors signals received by the transceiver 20. It may also monitor the output of the channel codec 21 and/or speech codec 3 to monitor the quality of the decoded signals. The signaling unit 5 is arranged to generate signals which are encoded by the channel codec 21 for transmission by the transceiver 20. These signals include data retrieved from the memory 7. The monitoring and control means 6 monitors the operation of the signal monitor 4 and the contents of the memory 7 and controls the operation of the signaling unit 5, and the transfer of data between the memory 7 and the speech codec 3. Data may be transmitted to the telephone from the base station control system 10, and this may be received by the channel codec 21 and transferred to the memory 7.

Figure 2:
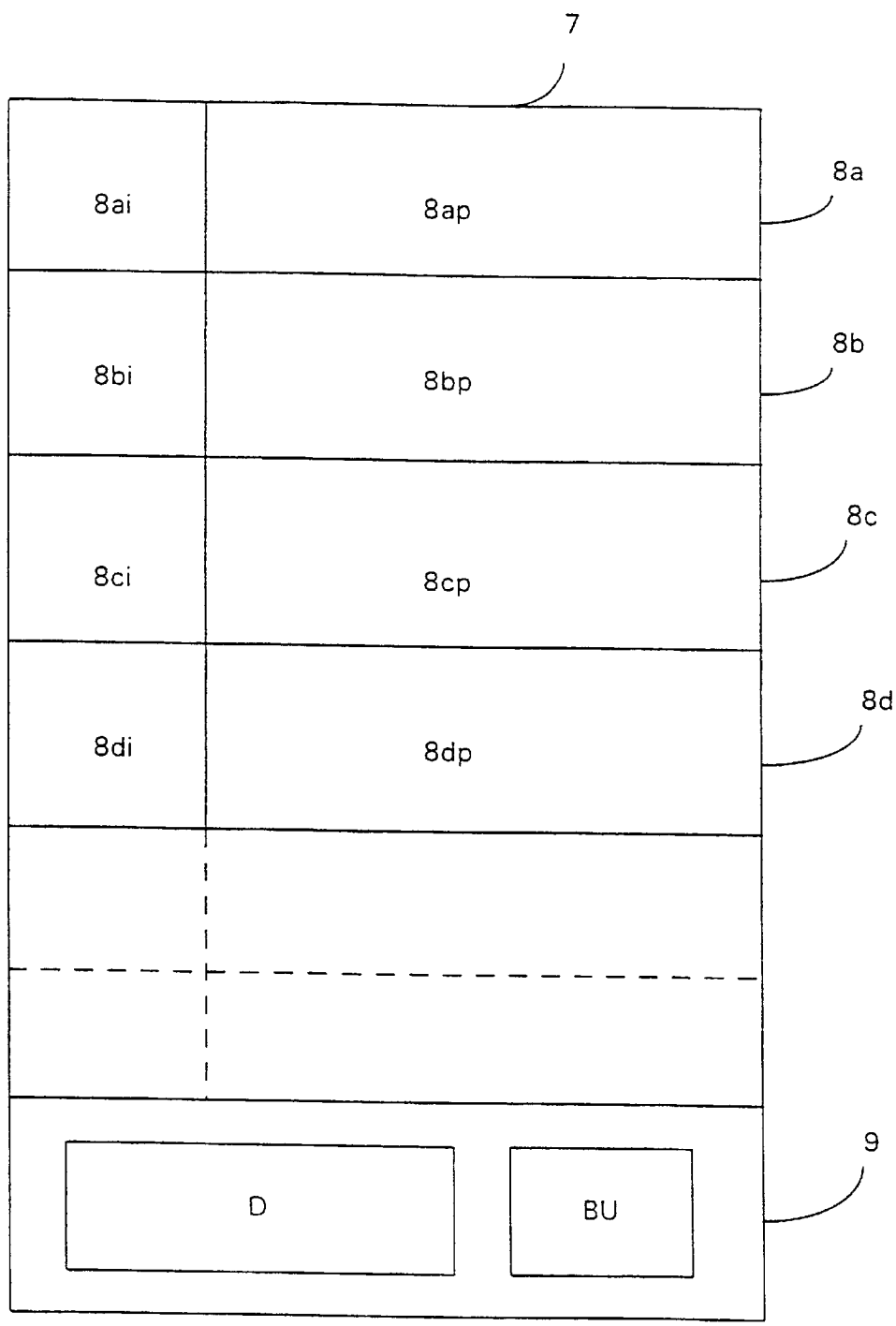
FIG. 2 shows the memory 7 of the telephone 1 of FIG. 1 in more detail.

FIG. 2 shows the memory 7 in more detail. The memory 7 has a number of programmable stores 8ap, 8bp, etc. for storing program data, with corresponding identifier stores 8ai, 8bi etc for storing corresponding identifiers. The stores 8ai, 8ap, 8bi, 8bp etc are programmable (overwritable) e.g. random access memory (RAM) or electronically erasable programmable read-only memory (EEPROM). The latter is preferable as data stored in RAM is lost if power is lost (e.g. through disconnection of the battery), whilst EEPROM data is only erased by entering a special signal. However, RAM is cheaper to provide. There is also a non-volatile read-only memory 9 which includes a program store BU containing a "boot-up" program, and another program store D containing program data for a "default" codec program. Other programmable and/or read-only stores may also be present in the memory 7, to hold data for supporting other functions of the telephone, such as stored numbers for a short-code dialling function.

In some cellular telephone systems, notably that known as GSM (Global System for Mobile communications) part of the control of the mobile telephone is carried out using program data carried on a removable module known as a SIM (Subscriber Identity Module). These are transferable from one telephone to another, to allow the use of the same telephone by users, to allow one user to use different telephones (e.g. a low-powered hand-portable unit and a high powered unit fitted in a motor vehicle). Individual SIMs may be arranged to provide program data to modify the contents of the memory when they are fitted to the telephone.

The mobile radio network shown in FIG. 1, illustratively a cellular telephone network, also comprises a radio base station control system 10 in radio communication with the mobile telephone 1, and connected to a mobile telephone network generally represented as 11.

Figure 3:
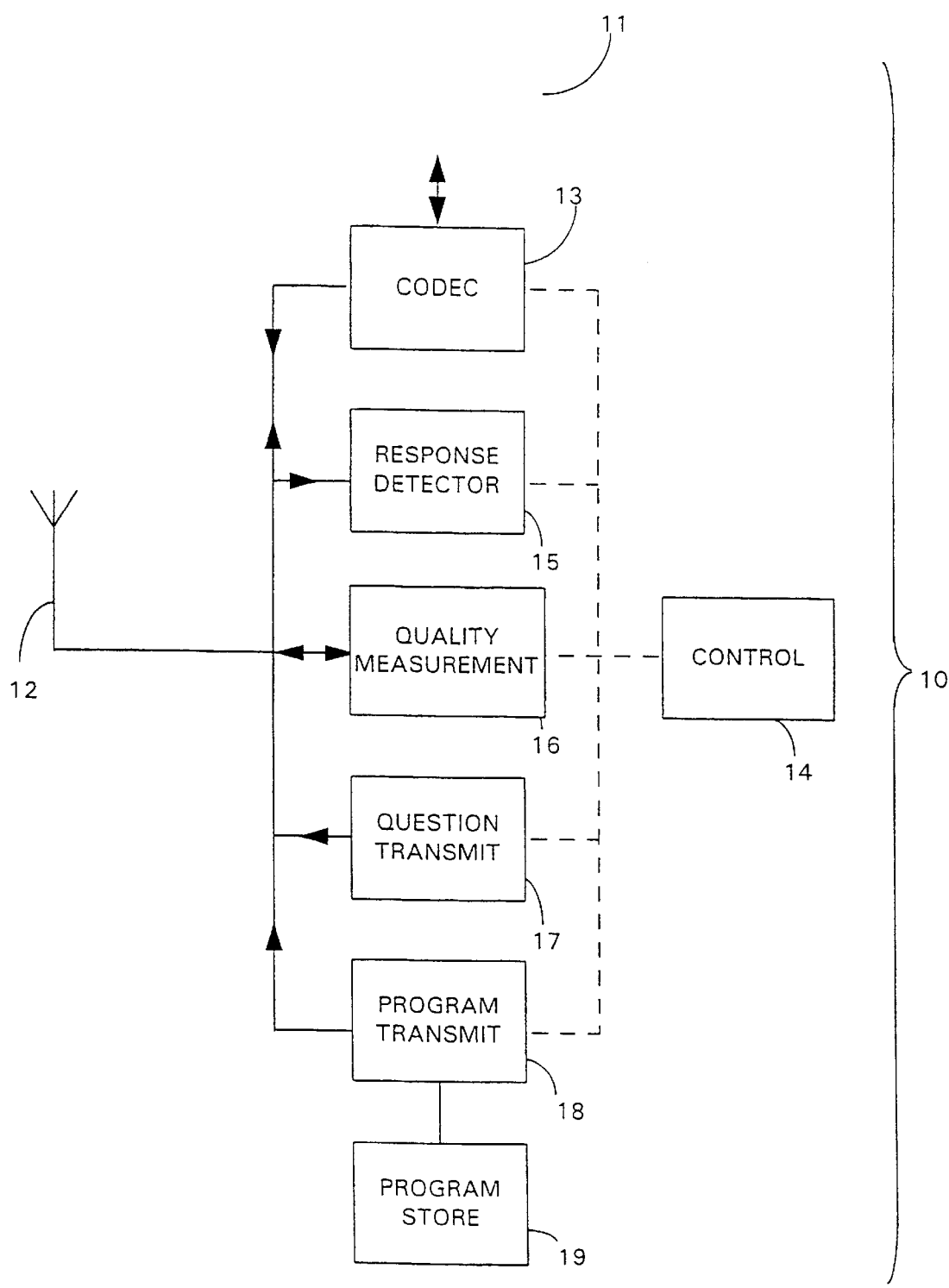
FIG. 3 shows the base station 10 of FIG. 1 in more detail.

FIG. 3 shows the various functional elements of the base station control system 10 in more detail. The base station control system 10 comprises a transceiver 13 for encoding and decoding signals, received from the network 11, for transmission as radio signals from an antenna at the base station site itself (12), and vice versa. The transceiver 13 can operate according to any one of two or more different codec programs, selected under the control of a control unit 14. The control unit 14 controls a signal generator 17 which generates signals for transmission by the antenna 12, a response detector 15 which is responsive to signals received by the antenna, and a quality measurement unit 16 for exchanging test data, by way of the antenna 12, with a co-operating mobile unit 1 to establish the signal quality of the link between the two. The control unit 14 also controls a data transmission means 18 which is configured to retrieve program data from a memory 19, and transmit it to the mobile unit by way of the antenna 12.

It will be appreciated that, although illustrated as being incorporated in the base station site 12, some or all of the elements described may be located elsewhere in the network 11. For example the antenna 12 may be located at some distance from the functional elements 13–19 forming the base station control system 10, which may itself be co-located with the corresponding functional elements serving other antennas. Such a co-located assembly of these functional elements is commonly referred to as a 'base site controller' (BSC).

Figure 4:
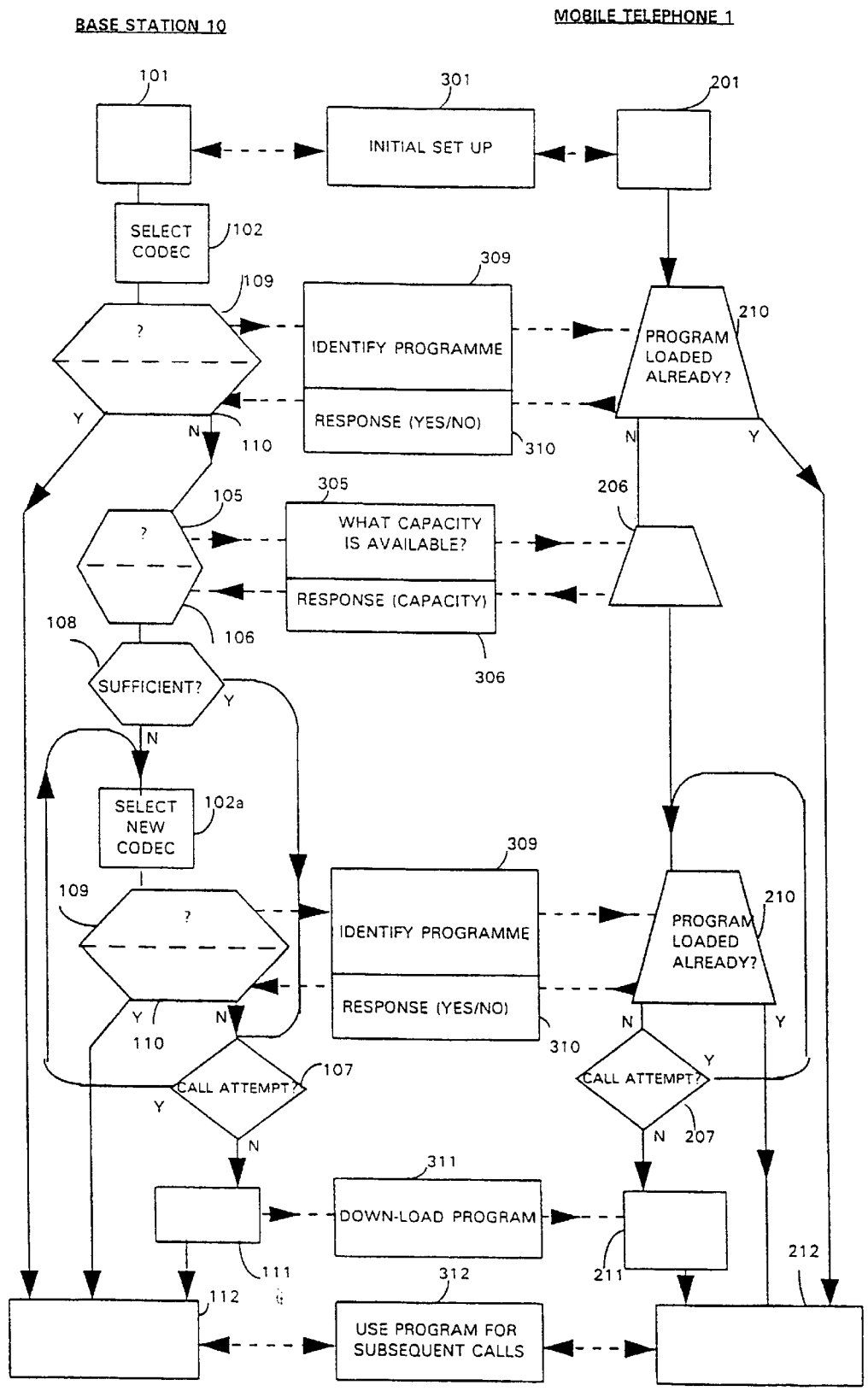
FIG. 4 is a flow chart illustrating a mode of operation of the mobile telephone 1 in co-operation with the base station 10.

The operation of this system will now be described, with reference to the flow chart of FIG. 4. In FIG. 4 the steps performed by the network are labelled 101 to 112, the steps performed by the mobile telephone are labelled 201 to 212, and radio transmissions between the mobile telephone and the base station control system or vice versa are labelled 301 to 312.

When initial contact is established between the network and the mobile telephone, an exchange of control signals 301 is carried out between the network and the mobile telephone (steps 101, 201 respectively). This includes a measurement of channel quality on the supervisory (signaling) channel. In practice this generally gives a good indication of the likely signal quality on the speech channels. An initial set-up program 201 is carried out in the mobile telephone using the boot up program BU in non volatile memory 9. The network element (in this example the base station control system 10) responsible for co-operating with the mobile telephone (1) selects a codec suitable for the prevailing conditions (connection-type, channel quality, etc) and transmits (109) a signal (309) to the mobile telephone to enquire if the selected program is already loaded in the memory 7 of the mobile telephone. At the mobile telephone 1, this code is extracted by the channel codec 21. An identity code for each individual codec is stored as a flag in stores 8*ai*, 8*bi* etc. The monitoring and control unit (6) causes the memory (7) to be searched to identify if any of the program code flags 8*ai*, 8*bi* etc, corresponds to the proposed code, and causes the signaling unit 5 to generate (step 210) a response (310) according to the presence or absence of the code in the memory 7. If the response is affirmative (Y) the mobile telephone and base station control system commence operation using the selected program.

If the response is negative (N), the base station control system next generates (105) an enquiry (305) as to what memory capacity is available in the mobile unit (1), and the signaling unit 5 in the mobile telephone generates (step 206) a suitable response 306. Based on this information, the base station 10 then determines whether this capacity is sufficient for the selected program (step 108), and, if it is, the network element 10 transmits the required codec program (step 111) as a signal 311 which is received (211) by the mobile telephone 1.

For copyright or other reasons there may be restrictions on the use of certain programs, for example to customers of certain networks only. This may require that these programs should not be disseminated to 'roaming' units; that is customers of one network currently connected to another. A check on the user identity may therefore be required.

Although indicated in FIG. 3 as separate individual addresses, it will be appreciated that a program requiring a high capacity will require more space than a program requiring a lower capacity, and a program requiring a large capacity may be added to the memory 7 at the expense of two or more programs requiring lower capacity. Clearly it is preferable that any empty memory space is used first.

If the memory capacity in the mobile telephone 1 is insufficient for the selected codec program, the base station control system 10 selects (step 102*a*) another codec suitable for the channel conditions, but requiring no more memory capacity than that available in the mobile telephone (1).

The network element 10 now transmits a signal enquiry (309) as before, to determine whether the mobile telephone 1 already has the program loaded (step 109), and the signaling unit 5 again generates a response.

If the response 310 is again negative the network element 10 transmits the required codec program (step 111) as a signal 311 which is received (211) by the mobile telephone 1.

The mobile telephone is now able to start co-operating with the network 11 to make calls (312), by exchanging signals with the network (steps 112/212).

The initial exchange of information and program loading can take place over a signaling channel or spare channel capacity when the mobile unit (1) first establishes contact with the base station 10. However, if an actual call is to be made, the downloading process 311 would delay the call set-up time. To avoid this problem, if a call attempt (107) takes place before the selected program on be loaded, the downloading step 111/211 is not followed, (or is interrupted if it has started), and the method starts again (step 102*a*) to search for a codec suitable for the channel conditions and memory capacity of the mobile telephone (1) which is already loaded in the mobile telephone (1).

The detector in the base station is arranged to detect the responses 306 and 310 received by the network from the mobile telephone to identify whether the capacity is suitable for the chosen codec and whether the program is already loaded. The transmitter 17 generates the signals to be transmitted to the mobile telephone (305 and 309).

The program selected in step 102 or 102*a* may be the default program stored in the address D in non-volatile memory 9. The default program will always be selected if the capacity available in over-writable memory (signal 306) is less than that required by any codec stored by the base station 10, and may be selected as being the optimum for the prevailing conditions, in other circumstances. If the default program is selected the response 310 will always be affirmative.

In order for the system to be compatible with existing mobile telephones which are not programmable, the network must be capable of operating in a mode which ensures that such mobile telephones are nevertheless communicated with using the programs which they have in their permanent memories. Standard mobile telephones, not having the upgrade facility, will in general not be capable of responding to the requests transmitted to them (305 and 309) and it is therefore necessary that the base station control system 10 responds appropriately in the absence of a response to these requests.

Some mobile telephones do not carry any alternative codecs, and may be incapable of transmitting responses to the requests 305 and 309. If no response is received by the network element 10 in step 110 or 106 the base station control system 10 is arranged to select the default codec at the next iteration of step 102*a*. When the default codec has been selected, the base station control system 10 is set to operate in step 110 as if an acceptable response is received, whatever response (if any) is actually received from the mobile telephone 1.

In the case of a mobile telephone which carries a number of codec programs but is not upgradable, the mobile telephone may have the selected program in its permanent memory, in which case the network element 10 must respond appropriately to a response (310) from the mobile telephone indicative that the chosen codec program is present.

Periodically whilst a mobile telephone is in communication with a base station, the channel quality and other properties are monitored and a decision is taken as to whether a different codec program would be appropriate. If a change is deemed appropriate, the process described above is repeated from step 102*a* (the selection of a codec suitable to the prevailing conditions and memory capacity of the mobile telephone 1)

An alternative mode of operation will now be described, in which program data is exchanged between two network elements 22, 23. These may be a base station and mobile unit analogous to the base station 10 and mobile unit 1 already described, but they may instead both be network terminations. A particular application is the conveyance of digitised signals at a non-standard bit rate when both terminations are capable of supporting such a rate. Most telecommunications carriers carry individual calls digitised at a standard bit rate (typically 64 Kbit/s), (these may be multiplexed together at higher rates but each individual call has 64 Kbits/s). Certain types of call involve a coarser digitisation—in particular some cellular telephone systems operate over the radio interface at 16 Kbit/s, to reduce the radio bandwidth required. Nevertheless, conventionally such signals are re-converted to the 64kbit/s rate for transmission over the fixed network. This is necessary because the call could be to terminals not fitted for operation at the lower bit rate, (e.g. a conventional telephone) and/or because the fixed network is designed for operation at the higher rate. However, if the terminals can ascertain that they are both capable of the non-standard mode of operation, or one terminal can be programmed by the other to achieve such a capability, this allows calls between those terminals to be made using this non-standard mode.

The network element 22 has a capability to download program data to the network element 23, which has the capability to receive such data. As will be described, both elements may have both capabilities, so program data may be transmitted in either direction. As the functions of these elements 22, 23 relevant to the following description are similar to those of the base station 10 and mobile unit 1 already described, a description of these functions will not be repeated here.

Figure 5:
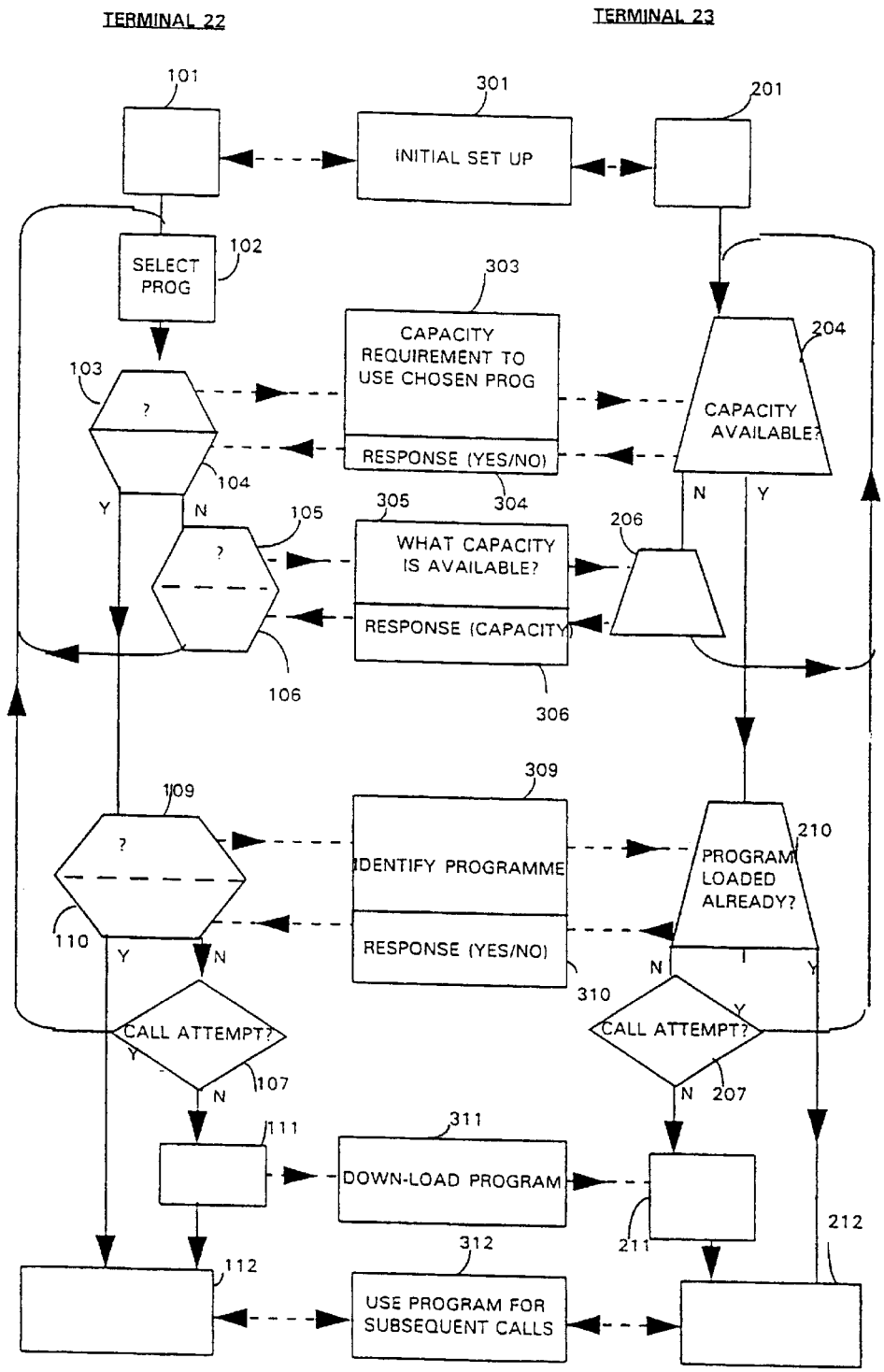
FIG. 5 is a flow chart illustrating an alternative mode of operation, suitable for use with two telecommunications elements 22, 23 each of which can provide program data to the other.

The operation of this system will now be described, with reference to the flow chart of FIG. 5. In FIG. 5 the steps performed by the first element 22 are labelled 101 to 112, the steps performed by the second terminal 23 are labelled 201 to 212, and transmissions between the terminals 22, 23 are labelled 301 to 312. Where the steps are common with the process shown in FIG. 4, the same reference numerals are used.

When initial contact is established between the first element and the second element, an exchange of control signals 301 is carried out between the first element and the second element (steps 101, 201 respectively). This identifies the type of connection to be made, the quality of the communications channel connecting the elements 22, 23, etc. An initial set-up program 201 is carried out in the second element using the boot-up program BU in non volatile memory 9. The first element (22) next selects a preferred program (step 102). It then transmits (step 103) a signal (303) to the second element indicating the amount of memory that the chosen program requires. (Note that the second element may already have this program loaded in its memory, but at this stage of the process it is not necessary for the first element to know this).

Next (step 204), the capacity of erasable memory (RAM or EEPROM) in the second element 23 is investigated to determine whether the total capacity available (addresses 8*a*, 8*b*, 8*c*, 8*d* etc) is sufficient to meet the requirement of the proposed program. Although indicated in FIG. 3 as separate individual addresses, it will be appreciated that a program requiring a high capacity will require more space than a program requiring a lower capacity, and a program requiring a large capacity may be added to the memory 7 at the expense of two or more programs requiring lower capacity. Clearly it is preferable that any empty memory space is used first. The second element (23) then completes this step (step 204) by generating a response 304, which is received by the first element (step 104), indicative of whether the second element has the required capacity available in its writable memory space, including any such memory space currently occupied.

If the response (304) is negative, the first element (22) next transmits an enquiry as to how much capacity is available, and the second element (23) generates a suitable response (step 306). The process is then repeated, (steps 102–104), but with the first element selecting (in step 102) a program requiring only the memory capacity now known to be available in the second element. On this cycle, the response 304 will of course be affirmative.

When the response 304 is that the capacity of the second element is suitable to use the selected program, the first element 22 (step 109) transmits a signal enquiry (309) as to whether the second element already has the program in its memory. The second element (23) transmits (210) a response (310) indicating either that it already has the program, or that it requires the program to be loaded.

The identity of the individual program is stored as a flag in stores 8*ai*, 8*bi* etc and this used in the step 210 in order to establish whether the response 310 to the enquiry (309) (indicating whether the program is already loaded in the memory of the mobile unit) should be in the affirmative.

If the response 310 is negative the first element 22 next transmits the required program (step 111) as a signal 311 which is received (211) by the second element 23.

The second element 23 is now able to start co-operating with the first element 22 to make calls (312), by exchanging signals with the first element (steps 112/212).

This procedure reduces the amount of signaling required, since by identifying the capacity of the memory (steps 305, 306) before identifying the selected program it avoids the first terminal (22) proposing the use of a program (in step 109) for which the second terminal (23) has insufficient capacity.

The initial exchange of information and program loading can take place over a signaling channel or spare channel capacity when the first element (22) first establishes contact with the second element 23. However, when an actual call is to be made, the downloading process 311 would delay the call set-up time. To avoid this problem, if a call attempt (107) takes place before the selected program can be loaded, the downloading step 111/211 is not followed, (or is interrupted if it has started), and the method starts again (step 102) to search for a suitable program which is already loaded in the second element (23).

The detector 15 is arranged to detect the responses 304, 306 and 310 received from the second element to the first element to identify whether the capacity is suitable for use of the selected program, or whether a further upgrade is possible and whether the selected program is already loaded. The transmitter 17 generates the signals to be transmitted to the second element (303, 305 and 309).

The program selected in step 102 may be the default program stored in the address D in non volatile memory 9, in which case the capacity required in over-writable memory (signal 303) is zero, and the responses 304 and 310 are always affirmative.

As the system must be compatible with elements which are not programmable, the first element 22 must be capable of operating in a mode which ensures that communication is made with such non-programmable elements using programs which they have already permanently loaded. Standard network elements, not having the upgrade facility, will in general not be capable of responding to the requests transmitted to them (303, 305 and 309) and it is therefore necessary that the first element 22 responds appropriately in the absence of a response to these requests. In the case of an element which carries a number of programs but is not upgradable, the element may already have the selected program loaded, in which case the first element 22 must respond appropriately to a response from the second element indicative that the chosen program is present. To allow for such a situation the request 303, transmitted by the first element 22 to enquire whether the memory capacity of the second element is suitable to use the chosen program, is formulated in such a way that if the second element is not programmable but does carry the required program it elicits a response which is taken by the first element in step 104 as being affirmative. Similarly in step 110, the first element 22 must respond in the manner appropriate to the program being already in the memory of the second element.

In circumstances where the second element does not carry any alternative program, then it is likely to be incapable of transmitting responses to the requests 303 and 305. If no response is received by the first element 22 in steps 104 and 106 the first element is arranged to select the default codec at the next iteration of step 102. When the default codec has been selected, the first element 22 is set to operate in steps 104, 108 and 110 as if an acceptable response is received, whatever response (if any) is actually received from the second element.

The two elements 22, 23 may both be items of customer equipment having programming data carried within their programmable memories. In this case, the exchange of data may be similar to that described with reference to FIG. 5, except that after steps 104/204, if the outcome is negative (i.e. the second terminal 23 has insufficient capacity for the proposed program), the second terminal 23 initiates the second phase by enquiring what capacity the first terminal has (step 105) and selecting a suitable program from its own store accordingly (step 102). On this second phase the response 304 must be affirmative, since the second phase only occurs if the second element 23 (now carrying out the enquiry 103) had insufficient memory to store the program initially proposed by the first element 22, and therefore any program the element 23 already has in its memory must be accomodatable in the larger memory of the first element 22. The roles of the first and second terminals are thus transposed in the next phase. Thus the transactions involve an exchange of "bids" to offer appropriate programming techniques, and if one of the terminals does not already have the program eventually selected, then that program is transmitted (step 311) to it from the other terminal.

To avoid uncontrolled dissemination of such enhanced programs, the system may be arranged such that a program acquired from a first element by a second terminal in this way cannot be retransmitted to a third terminal on establishment of a connection between the second and third terminals. This may be done, for example, by arranging for the program to include encryption or other copy-protection, to ensure that the program in the second terminal only operates correctly when communicating with a terminal having a unique identity code, that code being specific to the first element.

Among the codecs which could be introduced using the system described above, are multi-rate codecs capable of adapting to prevailing channel conditions. Such a codec is capable of switching readily between two or more modes. For example, in conditions of good channel quality a linear predictive coding process for analogue-to-digital conversion may be used by the speech codec 3 which operates at 5.6 kbit/s. The channel codec 21 adds an error correction algorithm, e.g. Viterbi coding, adding a further 3.4 kbit/s, allowing the signal to be carried on a 'half-rate' GSM channel (11.4 kbit/s). However, if channel quality deteriorates, a more complex error correction coding is used, requiring 14.8 kbit/s. This requires a 'full-rate' GSM channel (22.8 kbit/s). (In both cases 2.4 kbit/s control and synchronisation overhead makes up the balance of the channel capacity). A control signal is transmitted to indicate to the co-operating unit that such a change is to be made. The change may be initiated by either unit, according to which one detects a deterioration in signal quality. Running an adaptable codec of this type would be particularly appropriate for circumstances in which channel quality is initially close to the quality threshold above which half-rate coding is acceptable, or if the mobile unit is in rapid motion, so signal quality can be expected to change rapidly as the mobile unit approaches or recedes from the base station, or in circumstances where demand for available channels is changing rapidly, such that a switch to or from half-rate coding may become appropriate in order to balance signal quality against the number of calls that can be supported simultaneously.

What is claimed is:

1. A method of setting up a telecommunications connection between a first element and second element of a telecommunications system in which at least the first element is capable of transmitting codec program data over the telecommunications connection to the second element for controlling the operation of the second element, the method comprising:

exchanging data over the telecommunications connection being set up and determining existing signaling qualities and/or conditions to identify the most appropriate codec program data to use for communication between the first and second elements, exchanging data over the telecommunications connection relating to the codec program data already available to each element; and if the second element does not already have available to it the identified codec program data, transmitting the codec program data over the telecommunications connection from the first element to the second element.

2. A method as in claim 1 wherein the first element is a cellular radio fixed base station and the second element is a cellular radio mobile station.

3. A method as in claim 1 wherein the first and second elements are telecommunications terminals.

4. A method as in claim 1 wherein the program data transmitted from one network element to the other is configured such that it can only be used for telecommunications transactions between those two network elements.

5. A method of setting up a telecommunications connection between a first element and second element of a telecommunications system in which at least the first element is capable of transmitting program data over the telecommunications connection to the second element for controlling the operation of the second element, the method comprising:

exchanging data over the telecommunications connection being set up and determining then existing signaling qualities and/or conditions to identify the most appropriate program data to use for communication between the first and second elements;

exchanging data over the telecommunications connection relating to the program data already available to each element; and if the second element does not already have available to it the identified program data, transmitting the program data over the telecommunications connection from the first element to the second element;

wherein the first and second elements each have a memory for storing program data relating to one or more modes of operation; and the method further comprises:

transmitting a signal over the telecommunications connection indicative of a proposed mode of operation from the first element to the second element;

detecting the initial signal at the second element;

transmitting a response signal over the telecommunications connection from the second element to the first element, the response signal having a first characteristic if the memory in the second element does not contain program data for the proposed mode of operation indicated by the signal, and having a second characteristic if the memory already contains the program data;

transmitting the program data over the telecommunications connection from the first element to the second element if the first characteristic is detected; and operating the elements according to the proposed mode if either the first or the second characteristic is detected.

6. A method of setting up a telecommunications connection between a first element and second element of a telecommunications system in which at least the first element is capable of transmitting program data over the telecommunications connection to the second element for controlling the operation of the second element, the method comprising:

exchanging data over the telecommunications connection being set up and determining then existing signaling qualities and/or conditions to identify the most appropriate program data to use for communication between the first and second elements, exchanging data over the telecommunications connection relating to the program data already available to each element; and if the second element does not already have available to it the identified program data, transmitting the program data over the telecommunications connection from the first element to the second element;

wherein the method further comprises a process for selecting the proposed mode of operation, the process comprising:

identifying the type of connection to be made;

selecting a mode of operation suitable for the said connection type, for which the first element has the necessary program data;

exchanging signals over the telecommunications connection between the first element and the second element to determine what resources are available to the second element; and if the second element does not have appropriate resources for supporting the necessary program data, repeating the mode selection and signal exchange steps for further modes of operation until a mode of operation compatible with the capabilities of the second element is identified.

7. A method as in claim 6 in which signals are initially exchanged over the telecommunications connection to determine whether the second element has appropriate resources for the selected program.

8. A method of setting up a telecommunications connection between a first element and second element of a telecommunications system in which at least the first element is capable of transmitting program data over the telecommunications connection to the second element for controlling the operation of the second element, the method comprising:

exchanging data over the telecommunications connection being set up and determining then existing signalling qualities and/or conditions to identify the most appropriate program data to use for communication between the first and second elements, exchanging data over the telecommunications connection relating to the program data already available to each element; and if the second element does not already have available to it the identified program data, transmitting the program data over the telecommunications connection from the first element to the second element;

wherein if the second element does not already have the identified program data and a call attempt is in progress, the transmission of program data is interrupted, and the mode selection and signal exchange steps are repeated for further modes of operation until a mode of operation for which both elements are already programmed is identified.

9. A method of setting up a telecommunications connection between a first element and second element of a telecommunications system in which at least the first element is capable of transmitting program data over the telecommunications connection to the second element for controlling the operation of the second element, the method comprising:

exchanging data over the telecommunications connection being set up and determining then existing signalling qualities and/or conditions to identify the most appropriate program data to use for communication between the first and second elements, exchanging data over the telecommunications connection relating to the program data already available to each element; and if the second element does not already have available to it the identified program data, transmitting the program data over the telecommunications connection from the first element to the second element;

wherein the mode of operation is an analogue/digital speech encoder/decoder process.

10. A first element of a telecommunications system having:

means for storing codec program data suitable for controlling the operation of a second element;

means for exchanging data with said second element relating to existing signalling qualities and/or conditions and for responsively selecting the most appropriate codec program data to use for communication between the first and second elements when setting up a call to the second element over a telecommunications connection; and means for exchanging information over the said telecommunications connection relating to the codec program data already available to each element;

means for transmitting the selected codec program data over the telecommunications connection to the second element if the second element does not already have available to it the selected codec program data.

11. An element as in claim 10 being a cellular radio fixed base station control system.

12. An element as in claim 10 being a telecommunications terminal.

13. A first element of a telecommunications system having:

means for storing program data suitable for controlling the operation of a second element;

means for exchanging data with said second element relating to then existing signalling qualities and/or conditions and for responsively selecting the most appropriate program data to use for communication between the first and second elements when setting up a call to the second element over a telecommunications connection; and means for exchanging information over the said telecommunications connection relating to the program data already available to each element;

means for transmitting the selected program data over the telecommunications connection to the second element if the second element does not already have available to it the selected program data;

a memory for storing program data relating to one or more modes of operation;

means for transmitting a signal over the telecommunications connection indicative of a proposed mode of operation to the second element;

means for detecting a response signal received from the second element over the telecommunications connection, the response signal having a first characteristic if the memory in the second element does not contain program data for the proposed mode of operation indicated by the signal, and having a second characteristic if the memory already contains the program data; and means for transmitting the program data over the telecommunications connection to the second element if the first characteristic is detected; and means for operating according to the proposed mode if either the first or the second characteristic is detected.

14. A first element of a telecommunications system capable of receiving codec program data for controlling its operation over a telecommunications connection from another element, said first element comprising:

means for exchanging data over the telecommunications connection relating to the codec program data already available to each element, and for exchanging data over the telecommunications connection to determine existing signalling qualities and/or conditions to identify the most appropriate codec program data to use for communication between the elements; and means for receiving the codec program data over the telecommunications connection from the other element if the element does not already have available to it the identified codec program data, and for storing the said data.

15. A first element of a telecommunications system capable of receiving program data for controlling its operation over a telecommunications connection from another element, said first element comprising:

means for exchanging data over the telecommunications connection relating to the program data already available to each element, and for exchanging data over the telecommunications connection to determine existing signalling qualities and/or conditions to identify the most appropriate program data to use for communication between the elements; and means for receiving the program data over the telecommunications connection from the other element if the element does not already have available to it the identified program data, and for storing the said data;

a memory for storing program data relating to one or more modes of operation;

means for detecting a signal received over a telecommunications connection indicative of a proposed mode of operation, means for transmitting a response signal over the telecommunications connection to the other element, the response signal having a first characteristic if the memory in the second element does not contain program data for the proposed mode of operation indicated by the signal, and having a second characteristic if the memory already contains the program data;

means for receiving program data over the telecommunications connection from the other element; and means for operating the element according to the proposed mode.

16. An element as in claim 14 further comprising:

means for transmitting a signal to indicate if the element has appropriate resources to operate according to the selected mode of operation.

17. An element as in claim 14 being a telecommunications terminal.

18. An element as in claim 17, being a cellular radio mobile station.

19. A first element of a telecommunications system having:
- means for storing program data suitable for controlling the operation of a second element;
- means for exchanging data with said second element relating to existing signalling qualities and/or conditions and for responsively selecting the most appropriate program data to use for communication between the first and second elements when setting up a call to the second element over a telecommunications connection; and
- means for exchanging information over the said telecommunications connection relating to the program data already available to each element;
- means for transmitting the selected program data over the telecommunications connection to the second element if the second element does not already have available to it the selected program data;
- wherein the mode of operation is an analogue/digital speech encoder/decoder process.

20. A method of setting up a telecommunications connection between first and second elements in a telecommunications network using a selected compatible and most suitable one of plural modes of communication programs for such connection, said method comprising:
  (i) exchanging and processing preliminary data over said telecommunications network between said first and second elements relating to then existing signalling qualities and/or conditions on the connection being set up to identify:
    (a) the most appropriate one of plural possible modes of communication programs for current use in communicating between said elements, and
    (b) the modes of communication program data availability and capability of use at said elements;
  (ii) if the selected most appropriate mutually compatible mode of communication program is not already available at both elements, transmitting the most appropriate mutually compatible mode of communication program between the elements to make it available at both elements; and
  (iii) effecting telecommunications between said elements using said most appropriate mutually compatible mode of communication program.

21. A method as in claim 20 wherein said plural modes of communication programs include plural different voice codec programs.

* * * * *